Jan. 5, 1965
A. E. GANDY
3,163,947
AUTOMATIC GATE
Filed April 10, 1963
4 Sheets-Sheet 1
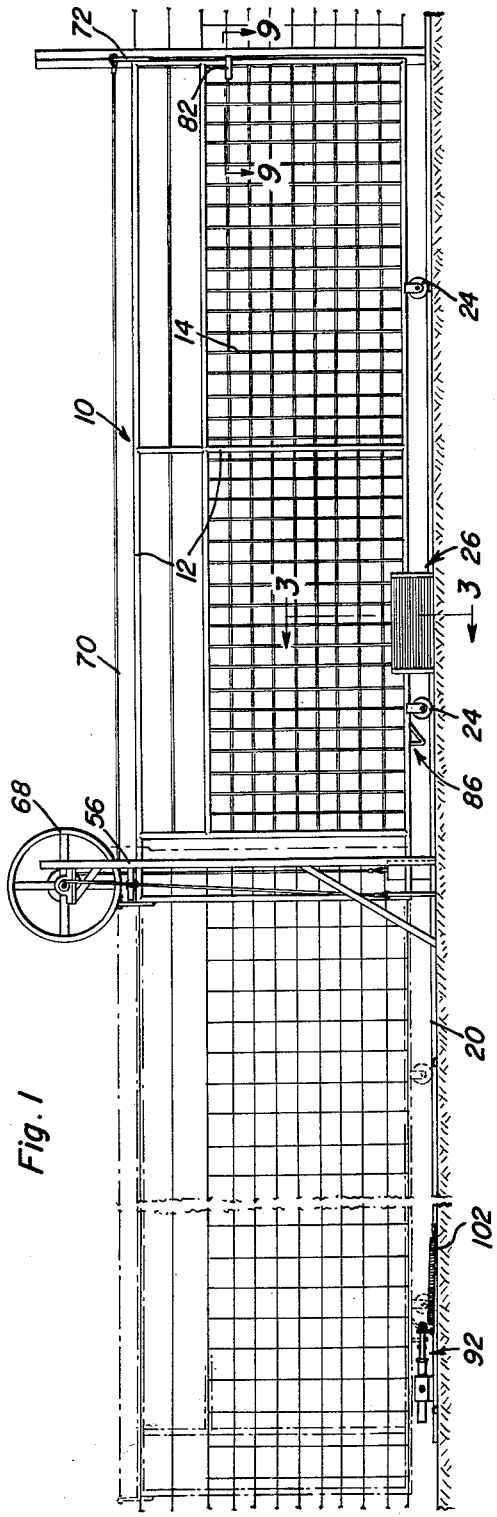
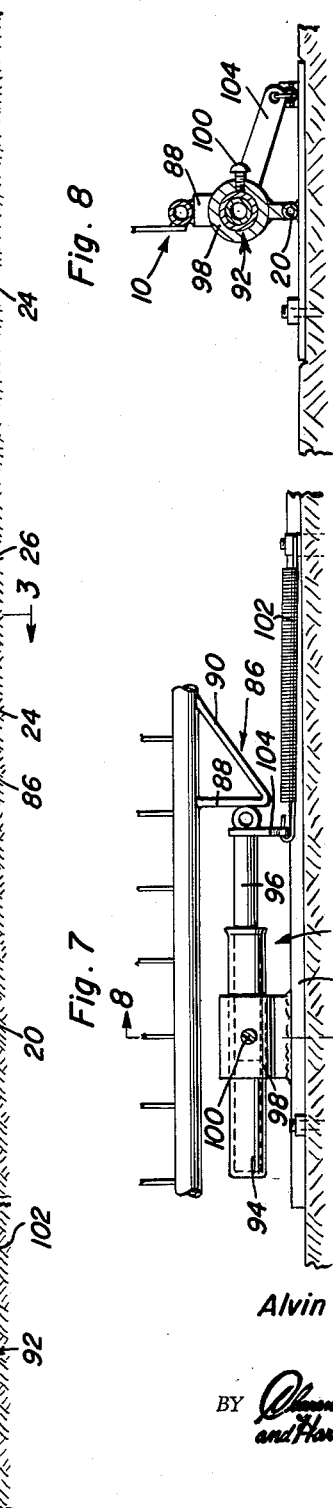
Alvin E. Gandy
INVENTOR.
BY *Clarence A. O'Brien*
*and Harvey B. Jacobson*
Attorneys Alvin E. Gandy
INVENTOR.

Jan. 5, 1965
A. E. GANDY
AUTOMATIC GATE
3,163,947
Filed April 10, 1963
4 Sheets—Sheet 3
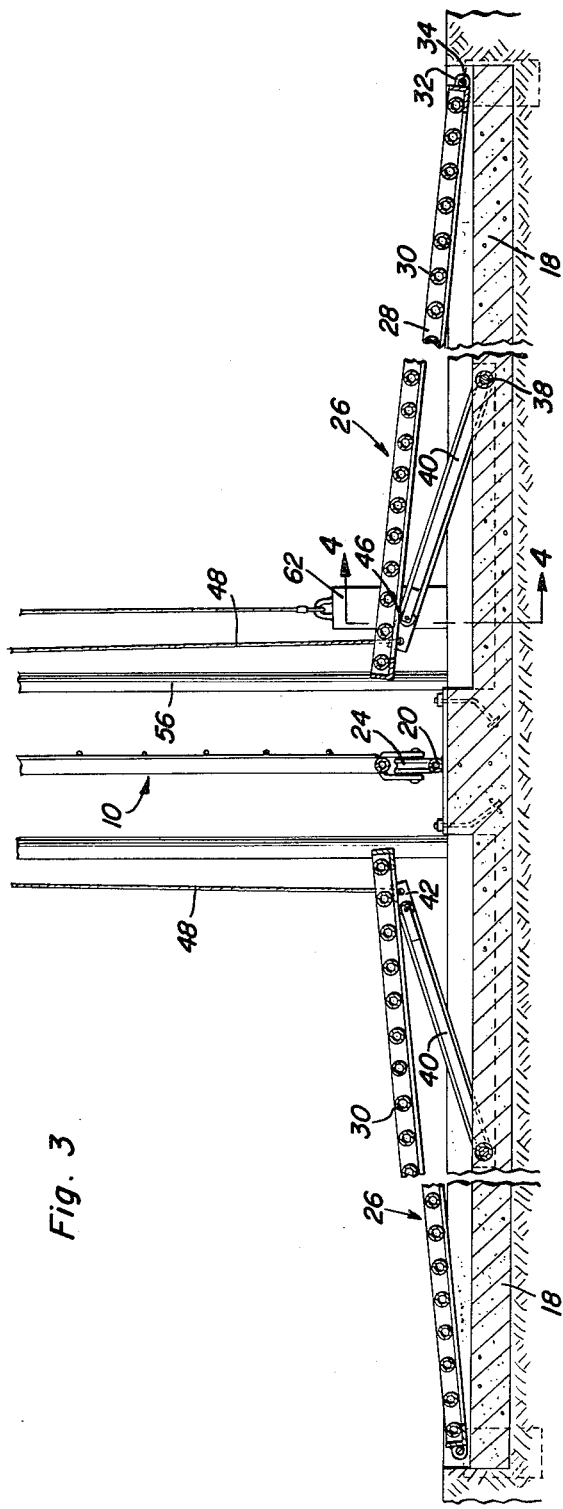
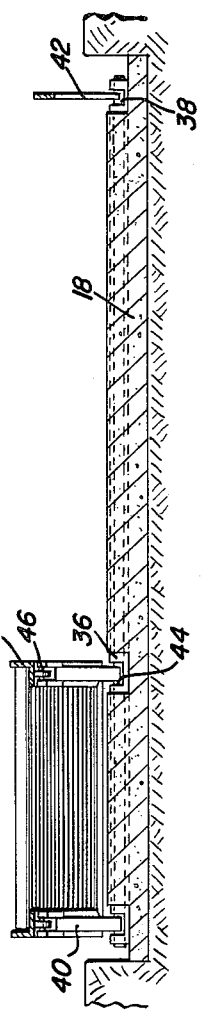
Alvin E. Gandy
INVENTOR.
BY *Clarence A.O'Brien*
and *Harvey B. Jackson*
Attorneys

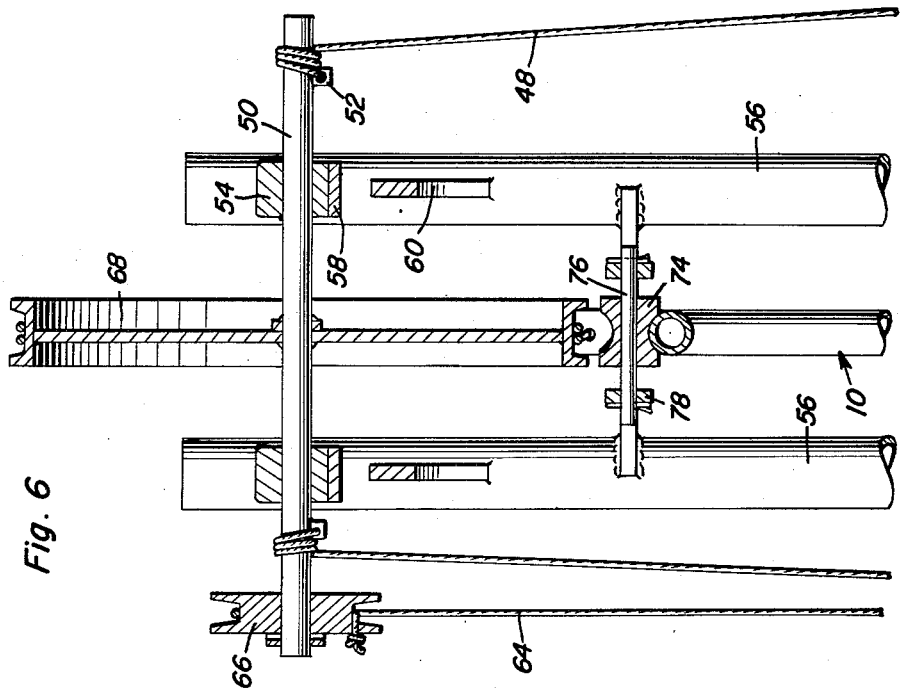
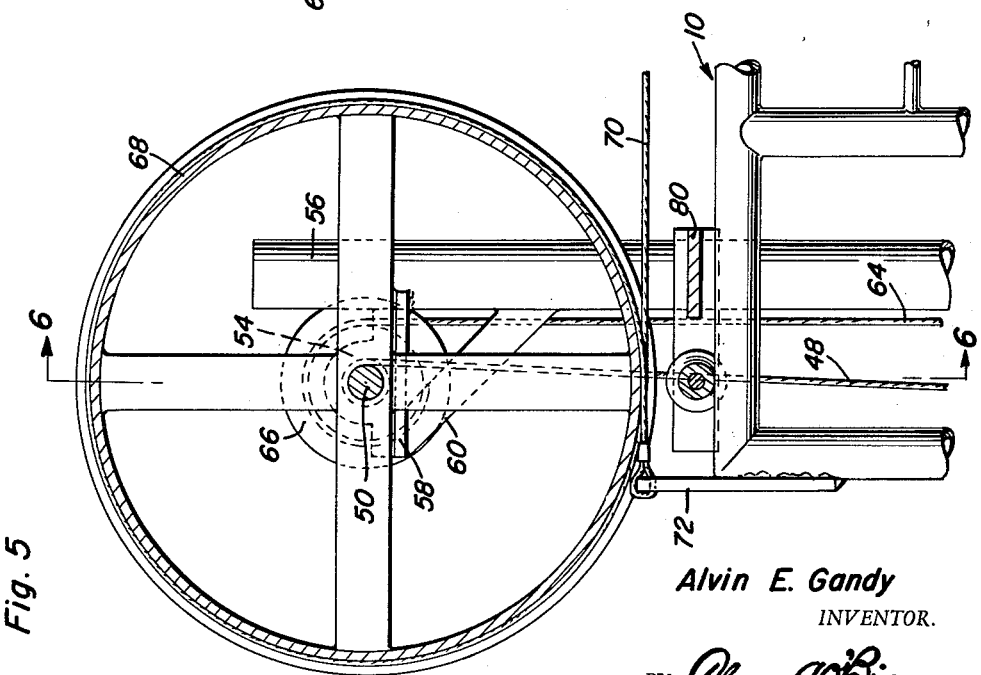

United States Patent Office 3,163,947
Patented Jan. 5, 1965

3,163,947
AUTOMATIC GATE
Alvin E. Gandy, P.O. Box 1271, Eden, Tex.
Filed Apr. 10, 1963, Ser. No. 272,092
6 Claims. (Cl. 39—25)

The present invention is generally concerned with gates, and is more particularly concerned wtih a gate which is automatically responsive to approaching vehicles, the gate, upon the approach of a vehicle, sliding laterally so as to allow free passage of the vehicle.

It is a primary object of the present invention to provide a gate which is automatically opened by an approaching vehicle from either side, the gate remaining open until the vehicle has passed therethrough, and subsequently automatically closing.

Another object of the instant invention is to provide a gate which is particularly adaptable for livestock growers in that, while automatically opening for vehicles, the gate cannot be operated by, for example, cattle.

Further, it is an object of the instant invention to provide an automatic gate which is of relatively simple construction, of a highly durable nature, and capable of providing trouble-free service.

It is another object of the instant invention to provide a gate, which while specifically constructed so as to open automatically upon the approach of a vehicle, can also easily be opened by a person physically sliding the gate.

Basically, it is intended that the gate include a pair of ramps, one located on each side thereof and operatively connected thereto whereby a vehicle, such as for example a car, truck, or tractor, upon approaching one of the ramps, is driven so as to position the wheels on one side thereof on the ramp, thus causing a downward pivoting of both ramps and a corresponding opening of the gate. After the gate has opened, the vehicle passes therethrough, being driven so as to also place a portion of its weight upon the other ramp thereby maintaining the gate in an open position until the vehicle has completely cleared the second or exit side ramp. After the vehicle passes over the second ramp a counterbalance unit slowly slides the gate back to its closed position and simultaneously pivots the ramps upward.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is an elevational view of the automatic gate of the instant invention, the open position of the gate being illustrated in phantom lines;

FIGURE 3 is a partial enlarged cross-sectional view taken substantially on a plane passing along line 3—3 in FIGURE 1;

FIGURE 4 is a cross-sectional view taken substantially on a plane passing along line 4—4 in FIGURE 3;

FIGURE 5 is an enlarged partial cross-sectional view taken substantially on a plane passing along line 5—5 in FIGURE 2;

FIGURE 6 is a cross-sectional view taken substantially on a plane passing along line 6—6 in FIGURE 5;

FIGURE 7 is an enlarged partial elevational view of the stop means used to limit the opening of the gate;

FIGURE 8 is a cross-sectional view taken substantially on a plane passing along line 8—8 in FIGURE 7; and FIGURE 9 is a partial enlarged cross-sectional view taken substantially on a plane passing along line 9—9 in FIGURE 1.

Figure 2:
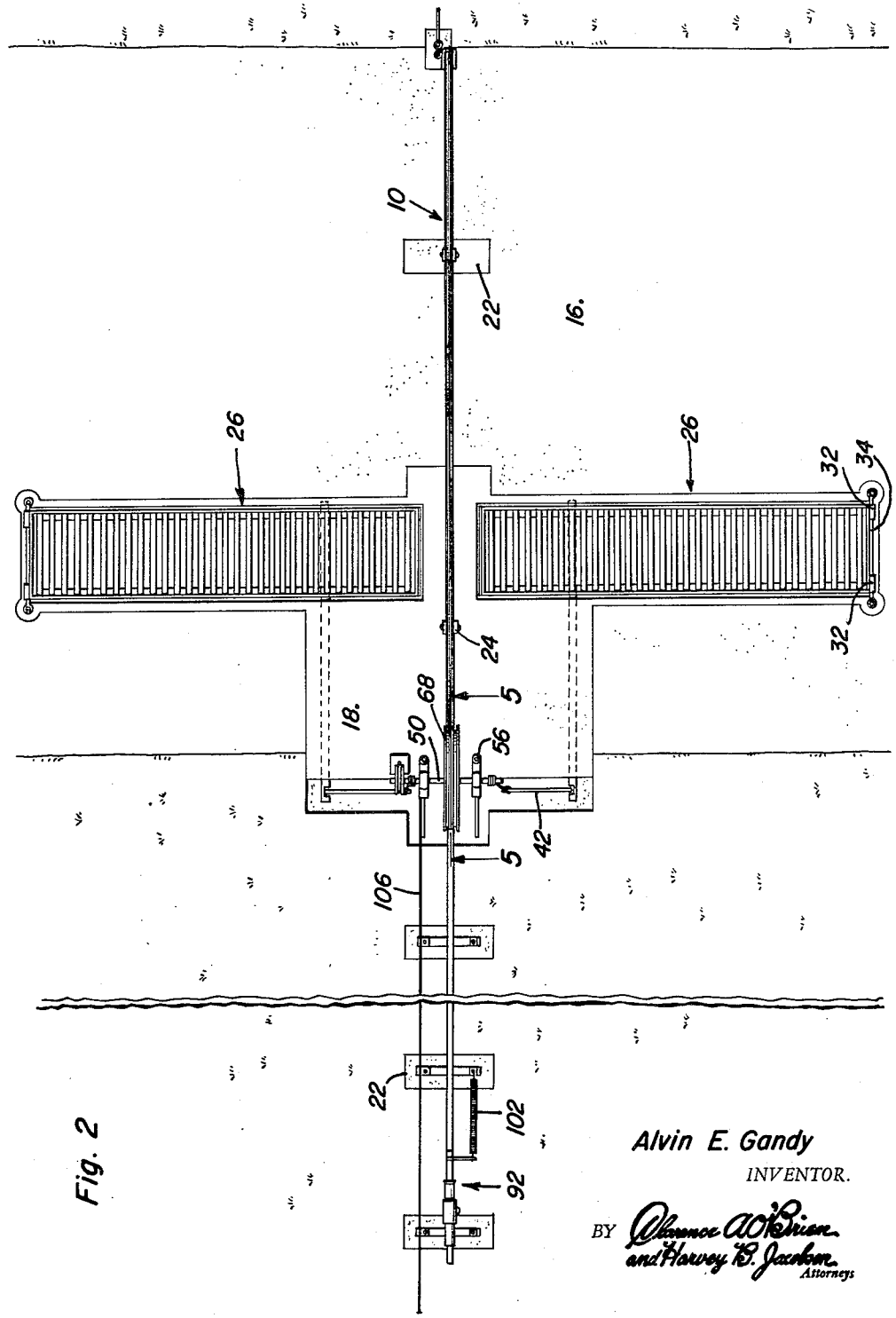
FIGURE 2 is a top plan view of the automatic gate.

Referring now more specifically to the drawings, reference numeral 10 generally designates the gate of the instant invention, this gate preferably formed of horizontal and vertical tubular frame members 12 and steel wire 14.

With reference to FIGURE 2, the gate 10 is preferably of a width substantially equal to the width of the road or passage 16 which it is to close. It is contemplated that an enlarged poured concrete foundation 18 be provided so as to form a stable base for both the gate 10 itself and the control mechanism therefor which shall be described presently. In addition to the enlarged main base 18, the track 20 upon which the gate 10 is to move, is also provided at spaced points along the length thereof with concrete footings 22.

As will best be seen in FIGURE 3, the gate 10 moves on the tubular track 20 by means of flanged wheels 24 secured at spaced points along and to the bottom of the gate 10. While only a single track 20 has been illustrated, it should be appreciated that, if so desired, a double track, in conjunction with pairs of wheels on the gate 10, can also be used.

Lateral movement of the gate 10 to an open position, as illustrated in phantom lines in FIGURE 1, is automatically effected by means of an approaching vehicle from either side of the gate, this being brought about by a pair of pivotally mounted ramps 26, one on each side of the gate 10 and in longitudinal alignment with each other. Each of the ramps 26 consists of a rectangular frame 28 formed of angle members positioned with one leg thereof extending horizontally inwardly of the frame 28, and a plurality of pipe members 30 extending transversely across the frame 28 with their outer ends resting upon the horizontal legs and being rigidly secured thereto as by welding. These pipe members 30 are to be spaced sufficiently far apart so as to prevent an animal, such as a cow, from walking thereon, thus avoiding an accidental opening of the gate 10, while at the same time being close enough together so as to support the wheels of any conventional vehicle which might be positioned thereon so as to effect an opening of the gate 10 as shall be pointed out presently.

The remote end of each ramp 26, relative to the gate 10, is provided with a pair of aligned sleeve members 32 thereon, these sleeve members 32 being rotatably positioned on a transversely extending rod 34 which in turn has its ends fixedly mounted to the base 18, the ramps 26 thereby being pivotally mounted for movement toward and away from the base 18, the ramps 26 in their collapsed position having the upper surface thereof substantially level with the upper surface of the base 18 which in turn is substantially level with the surrounding road 16.

A transversely extending hollow pipe 36 is rigidly fixed to the base 18 slightly to the rear of the forward end of each of the ramps 26, this pipe 36, preferably packed with grease, rotatably receives the elongated rod 38 to which two guide arms 40 and one lever arm 42 are secured. The arms 40 and 42 all extend forwardly through suitably provided apertures 44 in the pipe 36, the apertures 44 being sufficiently large so as to enable the free rotational movement of the rod 38 within the pipe 36. Each of the guide arms 40 is provided with a rotatably mounted roller 46 at its forward end, these rollers 46 being engaged with the side rail members 28 of the ramp 26 and rollable along the bottom surface thereof so as to, upon an upward pivoting of the arms 40, cause a similar upward pivoting of the forward end of the ramp 26.

Each of the lever arms 42, located remote from the corresponding pair of guide arms, has an elongated cable 48 secured to the free end thereof, each cable 48 extending upwardly to and wound about a transversely extending shaft 50, the upper end of each cable 48 being rigidly fixed to the shaft 50 as, for example, by means of the ears 52.

The shaft 50 is rotatably supported above the upper rail of the gate 10 by means of two bearing blocks 54 rigidly affixed to two vertical standards 56, one located on each side of the gate 10 with both standards 56 having their lower ends firmly anchored in the base 18. The bearing blocks 54 are positioned slightly toward one side of the standards 56 by means of horizontally extending plates 58 and diagonally extending braces 60, both welded to each other and to the adjoining standards 56.

Each of the cables 48 is maintained in a taut condition and wound about the shaft 50 so as to produce a rotation of this shaft 50 within the bearing blocks 54 upon a downward movement of the corresponding ramp 26, both ramps 26 effecting a rotation of the shaft 50 in the same direction. This rotation of the shaft 50 is resisted by a counterweight 62 suspended by a cable 64 which in turn has it upper portion wound about and affixed to a pulley 66 which is rigid with and rotatable with the shaft 50. The counterweight 62, while being insufficient so as to prevent the rotation of the shaft 50 upon the introduction of a predetermined minimum weight upon either of the ramps 26, is capable of returning the shaft 50 to its original position, thereby raising the ramps 26, upon a removal of the load from the ramps 26.

In order to translate the above-referred to rotational movement of the shaft 50 to a longitudinal movement of the gate 10, an enlarged flanged wheel or pulley 68 is rigidly affixed to the shaft 50 for rotation therewith between the standards 56 and in vertical alignment with the gate 10. Wound at least once, and preferably twice about the wheel 68 is a control cable 70, the ends of which are subsequently secured under tension to vertically extending plates 72 rigidly affixed to the opposite ends of the gate 10 whereby a rotation of the wheel 68 effected by a rotation of the shaft 50 produces a lateral movement of the gate 10 between the standards 56 by means of the cable 70.

In order to stabilize the gate 10, especially during the movement thereof, a guide roller 74 is provided in rolling embracing contact with the upper pipe of the gate 10, this guide roller 74 being rotatably mounted upon the shaft 76 which is in turn mounted between a pair of extending flat plates 78 having the inner ends thereof welded or otherwise affixed to a third plate 80 welded to and extending transversely between the standards 56 below the wheel 68.

The gate 10, in its closed position, has the forward end thereof received within a pocket 82 secured to a third standard 84 located at the remote side of the road 16, this pocket 82 being preferably in the form of a U-shaped bracket opening toward the gate 10 and having one leg thereof welded to the standard or post 84.

The opening movement of the gate 10 is limited by means of a depending stop 86 welded to the lower pipe of the gate 10 slightly inward of the near side of the gate, this stop 86 including a vertical abutment leg 88 and an angularly extending bracing leg 90. In addition to the stop 86, a shock absorber 92, of the type including a shell case 94 and plunger 96 telescoping therein, is provided, this shock absorber 92 being adjustably fixed within an enlarged hollow pipe 98 by means of a setscrew 100, the pipe 98 being rigidly affixed, as by welding, to the rail 20. Accordingly, it will be appreciated that as the gate 10 approaches its completely open position, the abutment leg 88 of the stop 86 engages against the forward end of the plunger 96 so as to arrest the movement of the gate 10, the gate 10 remaining in this position until the superimposed load, from for example a vehicle wheel, is removed from the ramps 26. Assisting the shock absorber 92 in both absorbing the shock of the opening gate 10 and bringing the movement of the gate 10 to a halt, is a tension spring 102 which has one end secured, through a laterally projecting flange 104, to the forward end of the plunger 96, and the other end rigidly secured at a point spaced forward of the forward end of the plunger 96. The coil spring 102, in addition to assisting in absorbing the shock of the opening gate 10, also acts, upon a release of the weight from the ramps 26, to assist in starting the closing movement of the gate 10 in conjunction with the counterweight 62, this action of the tension spring 102 also returning the plunger 96 to its original projecting position.

While not specifically a part of the instant invention, it will be appreciated that conventional gate sections, as indicated by reference numeral 106, can also be provided in conjunction with the novel gate structure constituting the instant invention so as to provide the desired enclosure.

From the foregoing, it will now be appreciated that a novel automatic gate has been defined, this gate opening automatically upon the approach of a vehicle from either side. This automatic opening of the gate is achieved by slidably mounting the gate on an elongated track and providing control apparatus for the movement of the gate responsive to the downward movement of either one of a pair of ramps, one provided on each side of the gate, these ramps being orientated so as to enable the wheels one one side of a vehicle to be conveniently driven thereon. As the vehicle passes onto the ramp, the gate, guided by upper and lower rollers, moves laterally away from the opening with the movement of the gate to its open position being arrested by a shock absorber assisted by a tension spring. After the vehicle has moved completely through the opening and past the ramp on the far side of the gate, a counterweight moves the gate back to its closed position, this return movement of the gate being assisted by the aforementioned spring.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An automatic gate structure consisting of a gate, wheels secured to the bottom of and supporting said gate, a pair of rigid spaced vertical standards provided at one side of the opening to be closed by said gate, first and second aligned ramps provided on opposite sides of said gate, said ramps being pivotally mounted at their remote ends, a transverse shaft, means rotatably mounting said shaft between the standards above said gate, means on said shaft for effecting a movement of the gate between the standards upon a rotation of the shaft, means operatively connecting the ramps and shaft for effecting a rotation of the shaft upon a downward movement of either of the ramps under a superimposed load, roller means rotatably mounted on said standards and engageable with the top of said gate throughout the entire range of movement so as to position and guide the gate, the means on the shaft for effecting a movement of the gate including an enlarged flanged wheel mounted vertically above the plane of the gate and a tensioned cable having the intermediate portion wound about the flanged wheel and the ends thereof secured to the opposite ends of the gate, and a counterweight and an elongated cable suspending the counterweight from the shaft, said cable being wound about the shaft upon the rotation of the shaft effected by the aforementioned load on a ramp, and said counterweight rotating the shaft in a reverse direction upon a removal of the superimposed load, the means operatively connecting each ramp and the shaft consisting of a transversely extending elongated rigid rod rotatably mounted beneath an intermediate portion of the ramp, said rod projecting laterally beyond the ramp to a point slightly beyond the vertical plane of the shaft, a pair of guide arms rigid with the rod and rotatable therewith, said arms extending toward the free end of the ramp, sliding means on the free ends of each arm, said sliding means being engaged with the undersurface of the ramp, a lever arm rigid with the rod and rotatable therewith, said lever arm being located substantially in the vertical plane of the shaft, and cable means having one end secured to the free end of the lever arm and the other end wound about the shaft in the opposite direction from the counterweight cable, said cable means being of a length so as to effect a raising of the lever arm and conseqeuntly a raising of the guide arms and near end of the ramp when the gate is in its closed position, the counterweight being sufficient to overcome the weight of the ramps.

2. The structure of claim 1 wherein each of said ramps consists of an elongated frame with transversely extending spaced rods.

3. The structure of claim 1 including an elongated rail upon which the gate bottom wheels are mounted.

4. An automatic gate structure consisting of a gate, vertical standard means provided at one side of the opening to be closed by said gate, at least one ramp provided on one side of said gate perpendicular thereto, said ramp being pivotally mounted on its remote end, a transverse shaft, means rotatably mounting said shaft on the standard means of said gate, means on said shaft for effecting a horizontal movement of the gate upon a rotation of the shaft, means operatively connecting the ramp and the shaft for effecting a rotation of the shaft upon a downward movement of the ramp under a superimposed load, and counterweight means for effecting a reverse rotation of the shaft upon a removal of the superimposed load from the ramp, said means operatively connecting the ramp and the shaft consisting of a transversely extending elongated rigid rod rotatably mounted beneath an intermediate portion of the ramp, said rod projecting laterally beyond the vertical plane of the shaft, guide arm means rigid with the rod and rotatable therewith, said arm means extending toward the free end of the ramp, sliding means on the free end of the arm means, said sliding means being engaged with the undersurface of the ramp, a lever arm rigid with the rod and rotatable therewith, said lever arm being located substantially in the vertical plane of the shaft, and cable means having one end secured to the free end of the lever arm and the other end wound about the shaft in the opposite direction from the counterweight cable, said cable means being of a length so as to effect a raising of the lever arm and consequently the raising of the guide arm means and near end of the ramp when the gate is in its closed position, the counterweight means being sufficient to overcome the weight of the ramp.

5. An automatic gate structure consisting of a gate, vertical standard means provided at one side of the opening to be closed by said gate, first and second aligned ramps provided on opposite sides of said gate, said ramps being pivotally mounted at their remote ends, a transverse shaft, means rotatably mounting said shaft, on the standard means above said gate, means on said shaft for effecting a horizontal movement of the gate upon a rotation of the shaft, means operatively connecting the ramps and the shaft for effecting a rotation of the shaft upon a downward movement of either of the ramps under a superimposed load, said means on the shaft for effecting a movement of the gate including an enlarged wheel mounted vertically above the plane of the gate and a tensioned cable having the intermediate portion thereof wound about the wheel and the ends thereof secured to the opposite ends of the gate, and a counterweight and an elongated cable suspending the counterweight from the shaft, said cable being wound about the shaft upon the rotation of the shaft effected by the aforementioned load on a ramp, said counterweight rotating the shaft in a reverse direction upon a removal of the superimposed load, said means operatively connecting each ramp and the shaft consisting of a transversely extending elongated rigid rod rotatably mounted beneath an intermediate portion of the ramp, said rod projecting laterally beyond the ramp to a point slightly beyond the vertical plane of the shaft, guide arm means rigid with the rod and rotatable therewith, said guide arm means extending toward the free end of the ramp, sliding means on the free end of the arm means, said sliding means being engaged with the undersurface of the ramp, a lever arm rigid with the rod and rotatable therewith, said lever arm being located substantially in the vertical plane of the shaft, and cable means having one end secured to the free end of the lever arm and the other end wound about the shaft in the opposite direction from the counterweight cable, said cable means being of a length so as to effect a raising of the lever arm and consequently a raising of the guide arm means and rear end of the ramp when the gate is in its closed position, the counterweight being sufficient to overcome the weight of the ramps.

6. An automatic gate structure consisting of a gate, a pair of rigid spaced vertical standards provided at one end of the opening to be closed by said gate, first and second aligned ramps provided on opposite sides of said gate, said ramps being pivotally mounted at their remote ends, a transverse shaft, means rotatably mounting said shaft between the standards above said gate, means on said shaft for effecting a movement of the gate between the standards on a rotation of the shaft, means operatively connecting the ramps and the shaft for effecting a rotation of the shaft upon a downward movement of either of the ramps under a superimposed load, said means on the shaft for effecting a movement of the gate including an enlarged wheel mounted vertically above the plane of the gate and a tensioned cable having the intermediate portion thereof wound about the wheel and the ends thereof secured to the opposite ends of the gate, whereby a rotation of the wheel will produce a horizontal movement of the gate, and a counterweight and an elongated cable suspending the counterweight from the shaft, said cable being wound about the shaft upon the rotation of the shaft effected by the aforementioned load on a ramp, and said counterweight rotating the shaft in a reverse direction upon a removal of the superimposed load.

References Cited in the file of this patent

UNITED STATES PATENTS

| 419,612 | Riggin | Jan. 14, 1890 |
|---|---|---|
| 655,551 | Glidden | Aug. 7, 1900 |
| 1,018,515 | Mills | Feb. 27, 1912 |
| 2,054,898 | Edwards | Sept. 22, 1936 |
| 2,346,388 | Peebles | Apr. 11, 1944 |
| 2,537,486 | Stevens | Jan. 9, 1951 |
| 2,594,515 | Swift | Apr. 29, 1952 |